Figures 8, 9:
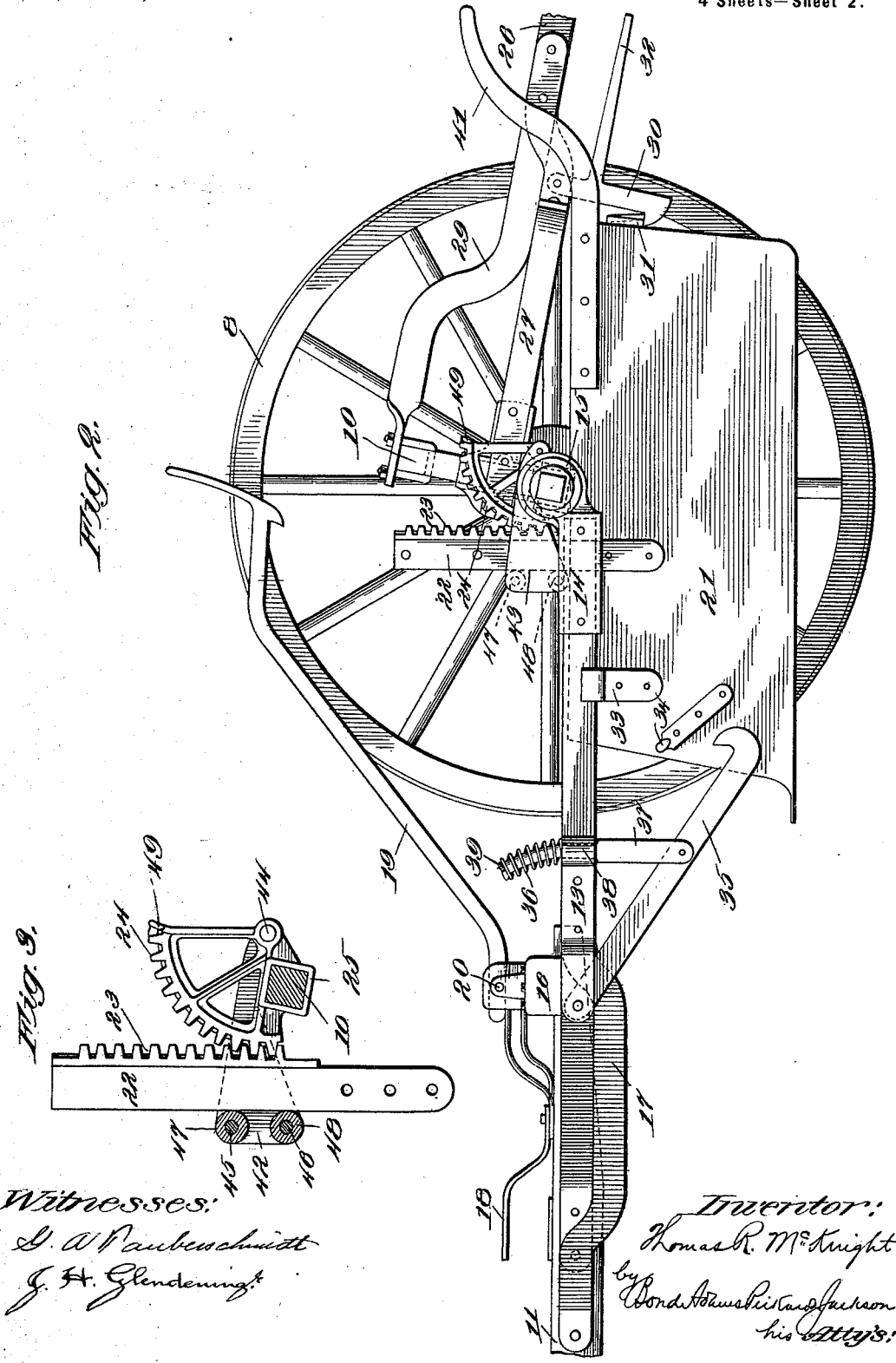

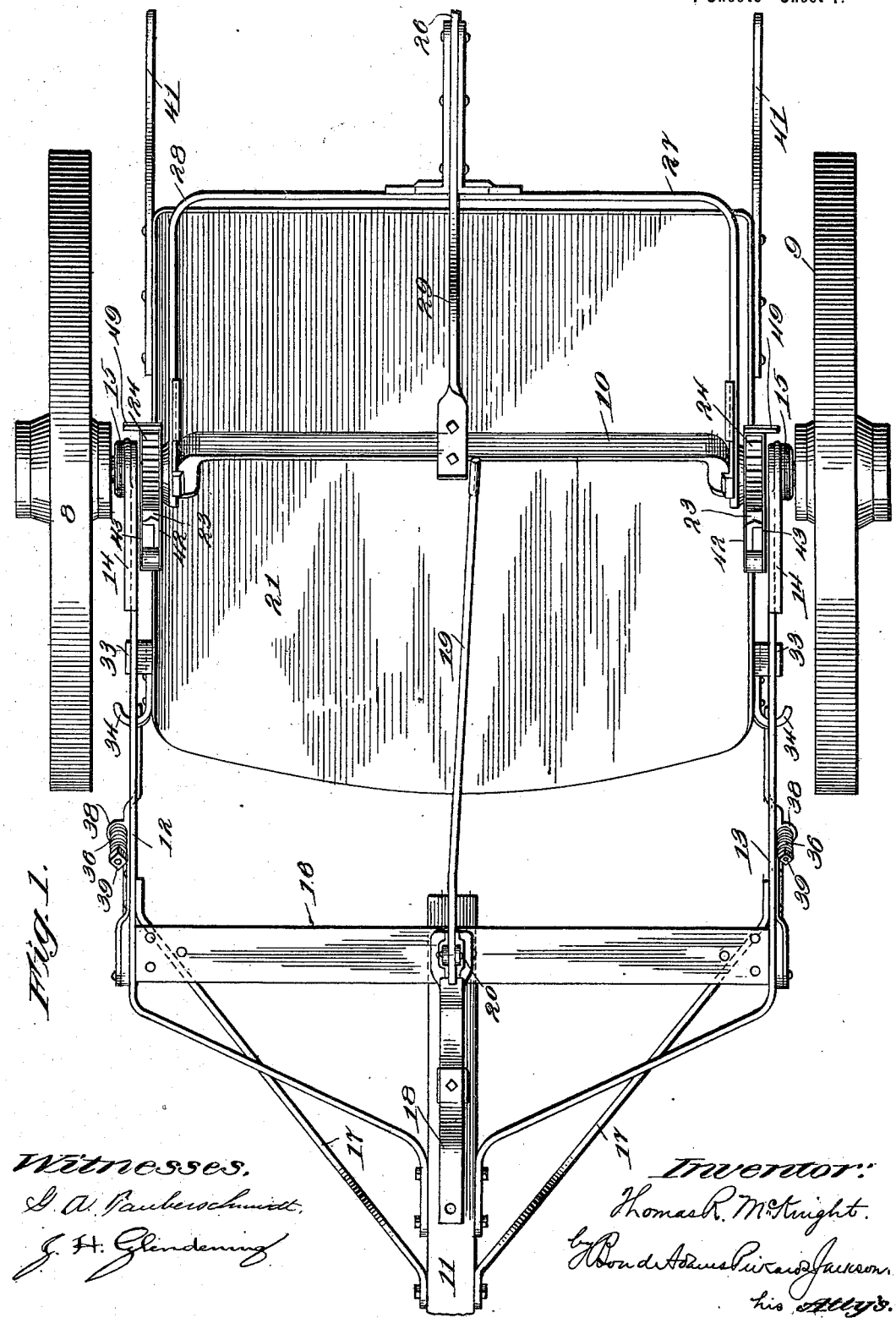

No. 672,798. Patented Apr. 23, 1901.
T. R. McKNIGHT.
WHEELED SCRAPER.
(Application filed Feb. 13, 1901.)
(No Model.) 4 Sheets—Sheet 2.

Witnesses:
Inventor:
Thomas R. McKnight,
by his Atty's

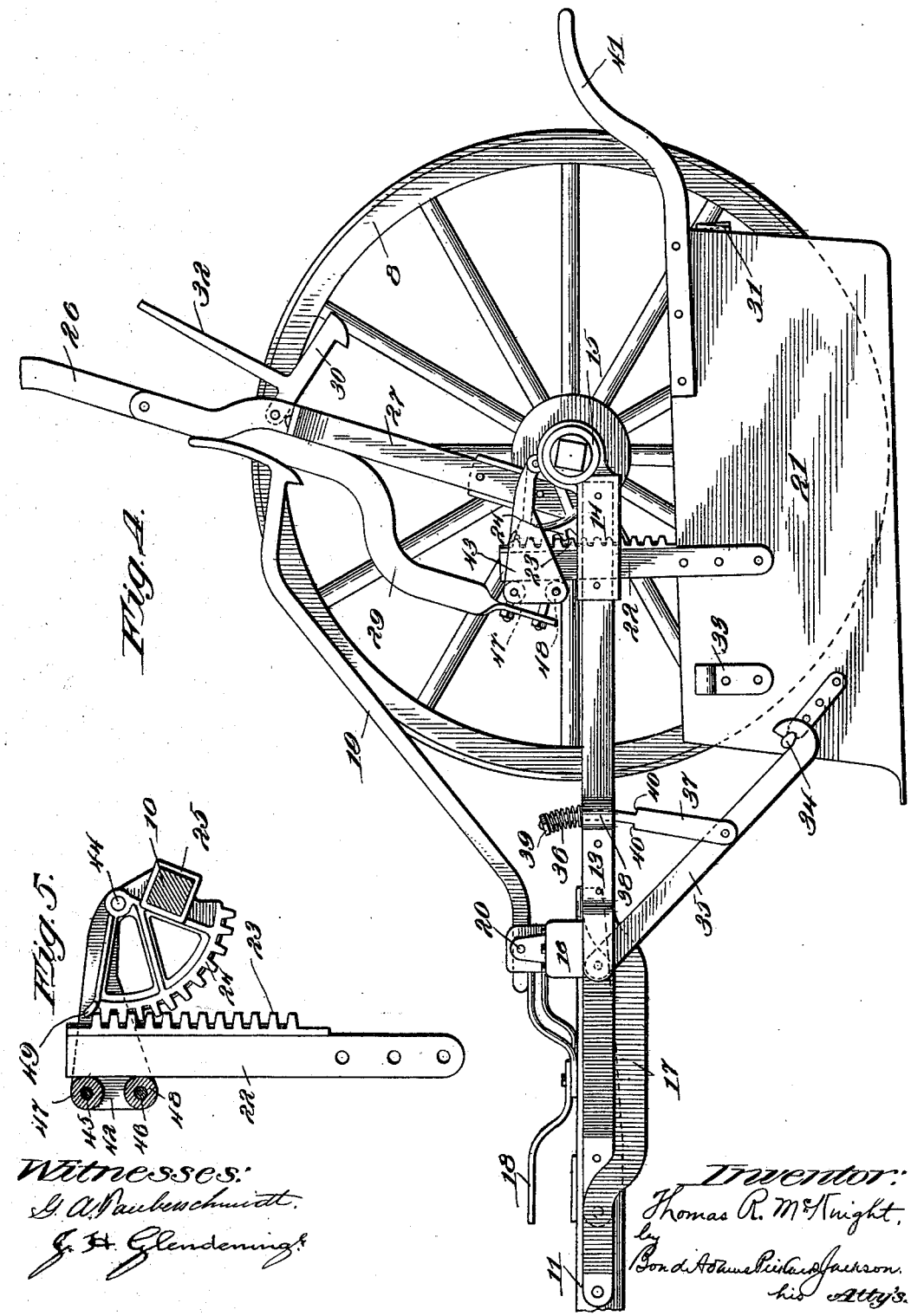

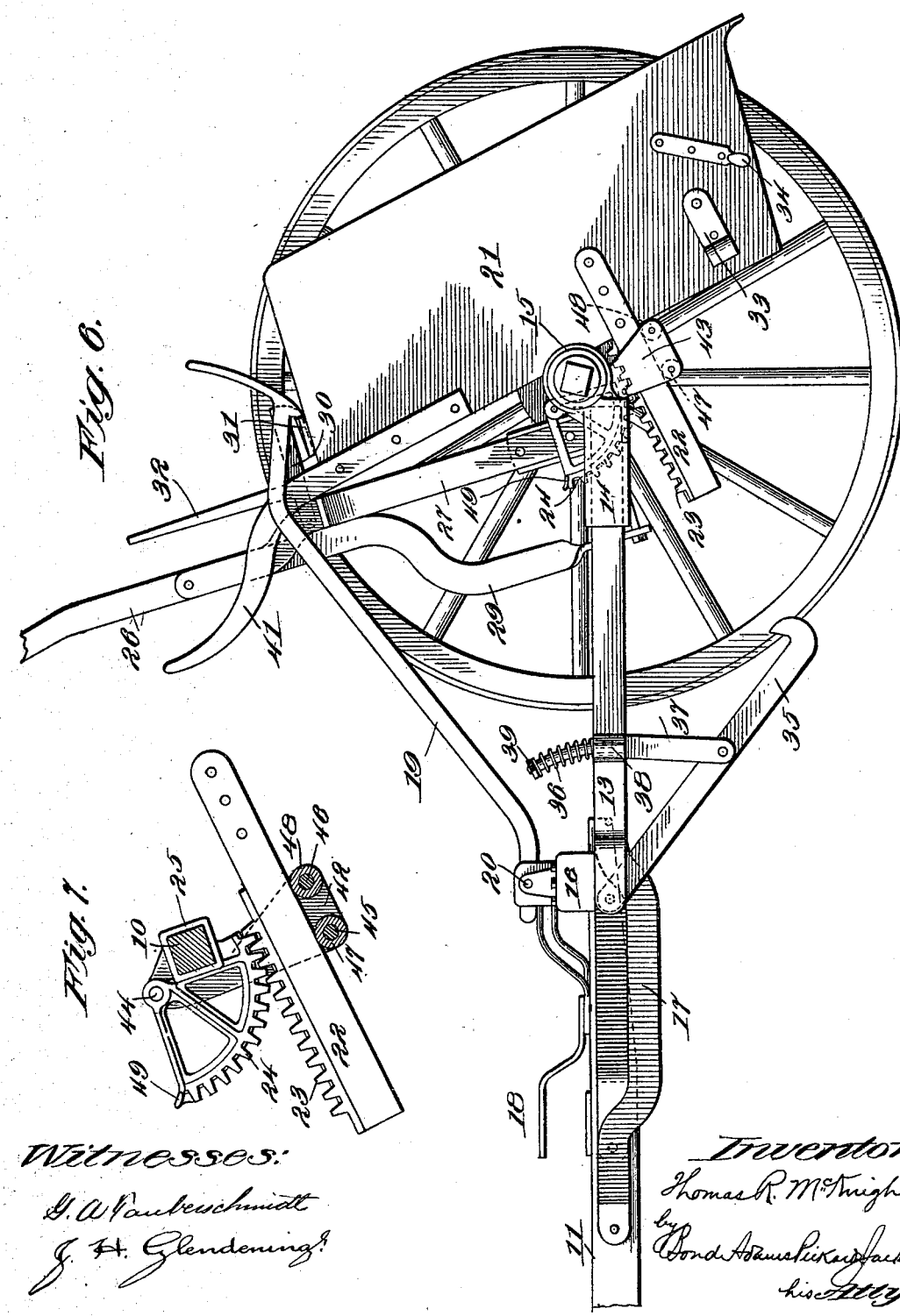

UNITED STATES PATENT OFFICE.

THOMAS R. McKNIGHT, OF AURORA, ILLINOIS, ASSIGNOR TO WESTERN WHEELED SCRAPER COMPANY, OF SAME PLACE.

WHEELED SCRAPER.

SPECIFICATION forming part of Letters Patent No. 672,798, dated April 23, 1901.

Application filed February 13, 1901. Serial No. 47,103. (No model.)

*To all whom it may concern:*

Be it known that I, THOMAS R. MCKNIGHT, a citizen of the United States, residing at Aurora, in the county of Kane and State of Illinois, have invented certain new and useful Improvements in Wheeled Scrapers, of which the following is a specification, reference being had to the accompanying drawings.

My invention relates to wheeled scrapers, and has for its object to provide certain improvements in implements of that class. One of the most important of such improvements has to do with the mechanism for raising and lowering the scraper-pan. The common type of wheeled scraper consists of a carriage consisting of a pair of wheels connected by an arched axle and provided with suitable draft devices, the carriage serving to carry the scraper-pan, which is suspended therefrom in such manner that it may be lowered for loading purposes and afterward raised clear of the ground for transportation purposes. In such scrapers suitable mechanism is provided by which the pan may be tilted to discharge its contents when desired. In the manipulation of such scrapers one of the most difficult operations is the raising of the pan to carrying position after it has been loaded and locking it in such position, and the latter part of the operation of raising the pan is usually the most difficult, because in scrapers as heretofore constructed usually the front portion of the pan rises first, the rear portion remaining on the ground until the front portion has been raised to carrying position, the rear portion then being raised also. It is evident, therefore, that much less power is required to raise the front end of the pan alone than is necessary to raise the entire pan with its contents, and in practice it is true to so great an extent that frequently it requires two or more men to complete the raising of the pan and lock it in raised position, when one man alone is able to start the operation. In order to overcome this objection to scrapers as heretofore constructed, I have provided means for raising the scraper-pan by which the operator has a greater leverage for completing the raising operation than he has when raising the front end thereof, so that as the weight to be lifted grows heavier the leverage increases, thereby making it easily possible for one man to perform the whole work of raising and locking the pan.

A further improvement consists in arranging the draft devices with reference to the lifting devices so that the draft of the team assists the operator in raising the pan.

Another improvement consists in providing spring mechanism for the draft-hooks, by which they are properly held in position to engage at the proper time and by which the hooks are permitted to vibrate as may be necessary in the operation of the scraper.

In the drawings, Figure 1 is a plan view. Fig. 2 is a side elevation, one wheel being removed, illustrating the scraper in carrying position. Fig. 3 is an enlarged detail, being a side view of a part of the apparatus for raising and lowering the pan, showing it in the same position as illustrated in Fig. 2. Fig. 4 is a view similar to Fig. 2, showing the pan in loading position. Fig. 5 is a view of a part of the raising and lowering mechanism, showing it in the same position as shown in Fig. 4. Fig. 6 is a view similar to Figs. 2 and 4, showing the pan after it has been dumped; and Fig. 7 is a view of the parts shown in Figs. 3 and 5, illustrating them in the position they occupy when the pan is in the position shown in Fig. 6.

Referring to the drawings, 8 9 indicate the wheels of the carriage, which, as shown in Fig. 1, are connected by an arched axle 10.

11 indicates the tongue, which is connected by straps 12 13 with the ends of the arched axle 10. As shown in the drawings, the straps 12 13 extend from the tongue back to the axle-spindles in substantially the same horizontal plane, so that the draft devices, being substantially on the level of the axle-spindles, do not interfere with the proper loading of the pan, as in prior constructions. As shown in Figs. 1 and 2, the rear ends of the straps 12 13 are provided with brackets 14, having collars 15, which fit upon the axle-spindles inside the wheels, so that the axle may rotate freely inside said collars. The straps 12 13 are held apart and properly braced by a cross-bar 16, as shown in Fig. 1.

17 indicates braces for the tongue, which extend from the straps 12 13 to the forward portion of the tongue, as shown in Fig. 1.

18 indicates the hammer-strap.

19 indicates the usual latch for the pan, which is pivoted upon the tongue at 20 in the usual way.

21 indicates the pan, which is of the usual shape. It is provided at each side with a vertically-extending rack-bar 22, having its rack-teeth 23 at its rear edge. The rack-bars 22 are rigidly secured to the sides of the pan and are substantially at right angles to the upper edge thereof. The rack-bars 22 serve not only to suspend the pan from the axle of the carriage, as will be hereinafter described, but also coöperate with racks 24, carried by the axle, for raising and lowering the pan. The racks 24 are best shown in Figs. 3, 5, and 7. They are segmental in form and are provided with a bracket 25, having a square passage adapted to fit upon the squared portion of the axle 10, as shown in Fig. 3, so that the racks 24 rock with the arched axle. The brackets 25 are placed eccentrically and adjacent to the teeth of the rack 24 which are uppermost when the pan is in carrying position, as shown in Fig. 2, the teeth of the rack 24 which then lie uppermost being farthest removed from said bracket. This is clearly illustrated in Figs. 3, 5, and 7.

Inasmuch as the axle 10 is the fulcrum, it will be observed that when the rack-bar 22 and rack 24 are in the position shown in Fig. 3 the rack-bar 22 will be nearer the axle 10 than when the said parts are in the position shown in Fig. 5. As already explained, the position shown in Figs. 4 and 5 is that assumed when the pan is in the loading position. Obviously by rocking the axle 10 the rack 24 may be rocked to raise or lower the rack-bars 22 and the pan carried by them, and when such operation takes place the leverage of the pan with reference to the axle will be varied as the pan is moved. For the purpose of rocking the axle 10 to raise or lower the pan it is provided with an operating-lever 26, provided with laterally-extending straps 27 28, which are secured to the sides of the arched axle, and a central strap 29, which is secured to the horizontal portion of the arched axle, as shown in Figs. 1 and 2. By operating the lever 26 the axle may be rocked, thereby rocking the racks 23 and raising or lowering the pan 21, as the case may be. The lever 26 carries a latch 30 in suitable position to engage a lug 31, secured to the rear side of the pan 21, preferably at the center near its upper edge, as shown in Fig. 2. The latch 30 is provided with a lever 32, by which it may be released from the lug 31. The weight of the lever 32 serves to throw the latch 30 in toward the lug 31 when the lever 26 is moved downward to the position shown in Fig. 2.

33 indicates stops secured to the sides of the pan near its upper front edges, said stops being adapted to engage the straps 12 13 when the pan is in carrying position, as shown in Fig. 2. The sides of the pan are also provided with hooks 34 at their front edges, adapted to be engaged by hooks 35, pivoted to the straps 12 13 and extending back toward the pan, as shown in Fig. 2. As shown in the drawings, the hooks 34 move into engagement with the hooks 35 from above, by which arrangement not only is the construction simplified and its operation made more certain and efficient, but the hooks 35 being turned upward instead of downward, as in prior constructions, they are less apt to accumulate trash. The hooks 35 are maintained in proper operative position by springs 36, which are mounted on the upper ends of bars 37, carried by the straps 12 13. The bars 37 are secured at their lower ends to the hooks 35, and their upper ends are rounded and extend through bearings 38 in the straps 12 13, respectively, and through the springs 36, as shown in Fig. 2. Nuts 39 at the upper ends of the bars 37 retain the springs 36 in position. The lower ends of the springs 36 rest on the straps 12 13 over the bearing 38 and resist the downward movement of said bars. As shown in Fig. 4, the bars 37 are provided with shoulders 40, which engage the lower edges of the straps 12 13 when the bars 37 are in their uppermost position, (shown in Fig. 2,) thereby limiting the extent to which said bars may move upward.

41 indicates the usual handles for the pan 21, which are secured to the sides of the pan and extend rearwardly therefrom.

For the purpose of holding the rack-bars 22 properly in engagement with the racks 24 retaining-brackets are provided, consisting of plates 42 43, which lie at opposite sides of each rack-bar 22 and rack 24, as shown in Fig. 1, and are connected at one end by a pivot-pin 44, which passes through the rack 24, and at the other end by pins 45 46, which carry rollers 47 48, as shown in Fig. 3, thus forming a housing. The rollers 47 48 bear against the outer edge of the rack-bar 22 and are so placed as to hold it properly in engagement with the rack 24 without binding it sufficiently to interfere with its proper operation.

49 indicates a limit-stop on the rack 24.

The operation of my improved scraper is as follows: When the pan is to be loaded, the operating-lever 26 is raised to the position shown in Fig. 4, the latch 30 being first released from the lug 31. By raising the lever 26 the rack 24 is rocked to the position shown in Figs. 4 and 5, moving the rack-bars 22 and the pan downward, as shown. As the pan moves downward its hooks 34 move into engagement with the hooks 35, said hooks 35, moving downward to the position shown in Fig. 4, compressing the springs 36. The pan is then loaded in the usual way and when loaded is raised to carrying position (shown in Fig. 2) by pulling the lever 26 backward and downward to the position shown in Fig.

2. At the beginning of the raising operation the rack-bars 22 are at their greatest distance from the axle 10, which constitutes the fulcrum of the lever 26. Consequently the operator has the least leverage at that time. The point of engagement of said rack-bars with the racks 24, which is the point at which the weight of the pan is sustained by the lifting-lever, is also above the plane of the fulcrum of the lever, as shown in Fig. 4. As the racks 24 are rocked, however, the points at which the rack-bars 22 engage the racks 24 move toward the fulcrum, owing to the cam-like or eccentric form of said racks 24, increasing the operator's leverage as the pan is raised, so that when the greatest weight is to be lifted the operator's leverage is the greatest. When the pan is raised to carrying position, the latch 30 automatically engages the lug 31, and the hooks 34 automatically disengage the hooks 35, since said hooks 34 rise high enough to clear the hooks 35, which are prevented by the shoulders 40 from moving too high. When the dumping-place is reached, the lever 26 is thrown upward without releasing the pan from the latch 30, so that the pan and the lifting devices are rocked together to the position shown in Fig. 6. The dumping operation is facilitated by reason of the fact that the draft devices are substantially on a level with the axle. Consequently the vertical distance from the line of draft to the front edge of the pan is greater, giving the team greater leverage for the dumping operation.

The shoulders 40 are so placed on the bars 37 as to hold the hooks 35 low enough so that they do not interfere with the rocking of the pan in dumping. When the pan is dumped, the latch 19 engages the lug 31 and holds it in such position.

In describing my improvements I have directed the description particularly to the machine illustrated in the drawings; but it is to be understood that my invention is not restricted to the specific details of the machine illustrated and described, since various modifications may be made without departing from my invention, which is restricted to specific details only in so far as such details are particularly claimed.

That which I claim as my invention, and desire to secure by Letters Patent, is—

1. In a scraper, the combination of a carriage, a scraper-pan, lever mechanism for raising said pan, and means for moving the point at which the weight is sustained by said lever mechanism toward the fulcrum thereof when said lever mechanism is operated to raise the pan, substantially as described.

2. In a scraper, the combination of a carriage, a scraper-pan, lever mechanism for raising said pan, and eccentric mechanism connecting said pan with the lever mechanism, and acting to move the point at which the pan is connected to said lever mechanism toward the fulcrum of said lever as the pan is raised, substantially as described.

3. In a scraper, the combination of a carriage, a scraper-pan, lever mechanism for raising said pan, a segmental rack eccentrically mounted and arranged to rock with said lever about the fulcrum thereof, and rack-bars engaging said segmental rack and connected with said pan, substantially as described.

4. In a scraper, the combination of a carriage, a pan having vertically-extending rack-bars, an operating-lever, and segmental racks engaging said rack-bars and operated by said lever, said segmental racks being eccentrically mounted on the fulcrum of said lever, the lower portions of said segmental racks being nearer said fulcrum than the upper portions thereof, substantially as described.

5. In a scraper, the combination of a carriage, consisting of an axle and wheels carried thereby, a scraper-pan, lever mechanism fulcrumed on said axle for raising the pan, and a connecting device mounted on said axle and connecting said lever mechanism with said pan, and acting to shift the point at which the weight of the pan is sustained nearer the axle as the pan is raised, substantially as described.

6. In a scraper, the combination of a carriage, consisting of an axle and wheels thereof, draft devices, a pan, an operating-lever fulcrumed on the axle for raising and lowering said pan, and a connecting device connecting said lever with the pan at a point on a plane never below that of the fulcrum of the lever, and acting to shift the point at which the weight of the pan is sustained nearer the axle as the pan is raised, substantially as described.

7. In a scraper, the combination of a carriage, a pan, a lifting-lever, connecting devices connecting said lever with the pan, means for shifting the point at which the weight of the pan is sustained by said lever nearer the fulcrum thereof as the pan is raised, said point lying in a plane above that of the fulcrum of the lever when the pan is in loading position, substantially as described.

8. In a scraper, the combination of a carriage, a pan, draft devices, retaining-hooks pivotally connected to said draft devices, devices carried by said pan adapted to engage said hooks from the upper side thereof, bars connected to said hooks and projecting above the draft devices, and spiral springs surrounding said bars and supported by the draft devices, said springs normally holding said hooks in a raised position, substantially as described.

9. In a scraper, the combination of a carriage, a scraper-pan, lever mechanism for raising said pan, and means connecting the pan to said lever at a point lying in a plane above the fulcrum thereof, when the pan is in a loading position, said connecting means being arranged to shift the point at which the weight is sustained by said lever toward the fulcrum thereof, when the lever is operated to raise the pan, substantially as described.

10. In a scraper, the combination of a carriage, a scraper-pan, lever mechanism fulcrumed substantially in the line of draft, for raising said pan, means connecting said pan with the lever mechanism in a plane lying above the line of draft, and means for moving the point of contact of said connecting devices with said lever mechanism, nearer the fulcrum of said lever as said lever is operated to raise the pan, substantially as described.

11. In a scraper, the combination of a carriage, a scraper-pan, lever mechanism for raising said pan, a segmental rack eccentrically mounted and arranged to rock with said lever about the fulcrum thereof, and rack-bars engaging said segmental rack above the line of draft, said rack-bars being connected with said pan, substantially as described.

12. In a scraper, the combination of a carriage, a pan having vertically-extending rack-bars, an operating-lever, and segmental racks engaging said rack-bars above the line of draft, said segmental racks being eccentrically mounted on the fulcrum of said lever, the lower portions of said segmental racks being nearer said fulcrum than the upper portions thereof, substantially as described.

13. In a scraper, the combination of a carriage, a pan, draft devices, retaining-hooks pivotally connected to said draft devices, devices carried by said pan adapted to engage said hooks from the upper side thereof, springs normally holding said hooks in a raised position, and stops limiting the upper movement of said hooks, substantially as described.

14. In a scraper, the combination of a carriage, draft devices, a pan, hooks pivoted to said draft devices, devices carried by said pan adapted to engage said hooks from the upper side thereof, bars 37 pivoted to said hooks and having their upper ends fitted in bearings in the draft devices, and springs, carried by said bars, acting to hold the hooks normally in a raised position, substantially as described.

15. In a scraper, the combination of a carriage, an axle therefor, a pan, a lifting-lever fulcrumed on the carriage-axle, connecting devices connecting said lever with the pan, the point at which the weight of the pan is sustained by said lever lying in a plane above that of the axle, and forward thereof, when the pan is in loading position, and draft devices connected to the axle, substantially as described.

THOMAS R. McKNIGHT.

Witnesses:
F. C. DILLON,
J. C. BEEDE.